(12) United States Patent
Bröckmann et al.

(10) Patent No.: US 9,991,813 B2
(45) Date of Patent: Jun. 5, 2018

(54) METHOD FOR DATA TRANSMISSION FROM A TRANSMITTER TO A RECEIVER IN AN AC POWER SUPPLY SYSTEM, AND APPARATUS FOR DATA TRANSMISSION WITH AC POWER SUPPLY SYSTEMS

(75) Inventors: Eckhard Bröckmann, Buseck (DE);
Wilfried Beck, Wiesbaden (DE);
Wolfgang Kemmler, Schlieren (CH);
Volker Deckers, Zürich (CH)

(73) Assignee: AIZO GROUP AG, Schlieren (CH)

( * ) Notice: Subject to any disclaimer, the term of this patent is extended or adjusted under 35 U.S.C. 154(b) by 919 days.

(21) Appl. No.: 13/498,130

(22) PCT Filed: Sep. 30, 2010

(86) PCT No.: PCT/EP2010/064613
§ 371 (c)(1),
(2), (4) Date: Mar. 23, 2012

(87) PCT Pub. No.: WO2011/039334
PCT Pub. Date: Apr. 7, 2011

(65) Prior Publication Data
US 2012/0181861 A1    Jul. 19, 2012

(30) Foreign Application Priority Data

| Sep. 30, 2009 | (DE) | ........................ 20 2009 013 152 |
| Sep. 30, 2009 | (DE) | ........................ 20 2009 013 154 |
| Apr. 9, 2010 | (EP) | .................................... 10159540 |
| Apr. 12, 2010 | (DE) | ........................ 20 2010 004 850 |
| Apr. 21, 2010 | (DE) | ........................ 20 2010 005 953 |

(51) Int. Cl.
H02J 3/00        (2006.01)
H02M 5/293    (2006.01)
H04B 3/54      (2006.01)

(52) U.S. Cl.
CPC .............. *H02M 5/293* (2013.01); *H04B 3/54* (2013.01); *H04B 2203/542* (2013.01);
(Continued)

(58) Field of Classification Search
CPC ....................................................... H02J 3/00
(Continued)

(56) References Cited

U.S. PATENT DOCUMENTS

| 4,371,867 A | * | 2/1983 | Gander ............... H02J 13/0034 |
| | | | 307/3 |
| 5,491,463 A | * | 2/1996 | Sargeant ................ H04B 3/542 |
| | | | 340/12.37 |

(Continued)

FOREIGN PATENT DOCUMENTS

| DE | 3329049 | 3/1984 |
| EP | 1134910 | 9/2001 |

(Continued)

*Primary Examiner* — Rexford Barnie
*Assistant Examiner* — Joseph Inge
(74) *Attorney, Agent, or Firm* — Davis & Bujold PLLC; Michael J. Bujold (57) ABSTRACT

The invention relates to a method for the data transmission from an emitter (1) to a receiver (2) in an AC voltage network, comprising a distributor (3) and at least one user group (4) with one or several users (5), wherein the emitter (1) feeds a signal to the AC voltage network by means of a power source (6).

16 Claims, 4 Drawing Sheets

(52) U.S. Cl.
CPC ........... *H04B 2203/5412* (2013.01); *H04B 2203/5458* (2013.01); *Y10T 307/25* (2015.04)

(58) Field of Classification Search
USPC .......................... 307/11; 370/503; 375/238
See application file for complete search history.

(56) References Cited

U.S. PATENT DOCUMENTS

| | | | | |
|---|---|---|---|---|
| 5,977,650 | A | * | 11/1999 | Rickard et al. .................. 307/3 |
| 6,879,809 | B1 | * | 4/2005 | Vega .................. G06K 7/0008 |
| | | | | 455/41.1 |
| 7,852,230 | B2 | | 12/2010 | Billo |
| 2005/0086546 | A1 | * | 4/2005 | Darshan ............... G06F 1/3209 |
| | | | | 713/300 |
| 2006/0038444 | A1 | * | 2/2006 | Bueti ....................... H04B 3/54 |
| | | | | 307/1 |
| 2008/0042631 | A1 | * | 2/2008 | Wong et al. ................. 323/283 |
| 2009/0015319 | A1 | | 1/2009 | Tzeng |
| 2011/0032111 | A1 | * | 2/2011 | Gallavan .............. G01R 31/023 |
| | | | | 340/659 |

FOREIGN PATENT DOCUMENTS

| | | |
|---|---|---|
| EP | 1641178 | 3/2006 |
| EP | 1675274 | 6/2006 |
| FR | 2401563 | 3/1979 |
| FR | 2635424 | 2/1990 |
| WO | 2005/036374 | 4/2005 |
| WO | 2006/034866 | 4/2006 |

\* cited by examiner

METHOD FOR DATA TRANSMISSION FROM A TRANSMITTER TO A RECEIVER IN AN AC POWER SUPPLY SYSTEM, AND APPARATUS FOR DATA TRANSMISSION WITH AC POWER SUPPLY SYSTEMS

The present invention relates to a method for data transmission from a transmitter to a receiver in an AC power supply system, and to an apparatus therefore.

The prior art discloses various methods for data transmission in an AC power supply system. Thus, by way of example, U.S. Pat. No. 5,491,463 describes a power line communication (PLC) method for individually actuating appliances, wherein address and control data are transmitted during the zero crossings of the AC supply voltage. A disadvantage in this case is that this method always requires a dedicated 120-kHz generator in order to generate burst signals, and the receiver needs to be equipped with comparatively complex detector circuits. Furthermore, large parallel capacitances are detrimental to optimum transmission.

EP1134910A2 discloses a method which uses different lengths of zero switching operations or blanking operations for the supply voltages to define different bit types and uses a simple circuit to allow the receiver to detect the bit types and to evaluate the respective control information. This data transmission method has the technical possibility of transmitting information to a plurality of loads connected to a common AC power supply by virtue of a line interruption or blanking operation being effected around the zero crossing of the voltage. Depending on the system, the loads cannot have any inductive or capacitive load components in this case, however, since these would disturb the described voltage blanking at the zero crossing of the voltage curve.

WO2006034866A1 describes a method for modulating the active power in one or more loads in an AC power supply system for the purpose of transmitting information via the power supply line by virtue of specifically varied active power in the connected load. To transmit the information, variations of the instantaneous value of the active power are made to an arbitrary degree (enlargement or reduction) and is impressed into the AC power supply line by a transmitter and are evaluated by a receiver. This method compels a high level of technical complexity in the modulator.

EP1675274A1 shows a method for data transmission by virtue of modulation in an AC power supply system having a plurality of connected loads. In this case, reactive current components in a power supply line in an AC power supply system are derived by a special electronic circuit, by connecting a special load. However, such a method is possible only in the outgoing channel, that is to say from the distributor in the direction of the load.

It is an object of the invention to overcome the disadvantages of the prior art. In particular, the aim is to provide an easily implemented method for data transmission in the return channel, and an appropriate apparatus.

This object is achieved by the method defined in independent patent claim 1 and by the apparatus defined in independent patent claim 8. Further embodiments can be found in the dependent patent claims.

At this juncture and subsequently, a return channel is understood to mean a channel for data transmission in an AC power supply system from the load end, particularly from an end user, in the direction to the AC voltage source. Accordingly, an outgoing channel is understood to mean a transmission channel in the opposite direction, that is to say in the direction to the load.

In a building power supply system, a load group within the present context is that component of the building power supply system, starting from the system access, which branches off from the distributor and is routed to one or more loads. By way of example, a load group comprises all system receptacle outlets and also the lights in a room. Usually, each load group has a dedicated fuse, so that in the event of damage a system failure occurs only in the relevant load group, and the entire building is not isolated from the system. In this case, the term building power supply system is intended to be understood as a synonym for building power supply systems and similar wiring arrangements, particularly also for onboard power supply systems in vehicles, railroads, ships and aircraft. At this juncture and subsequently, an AC power supply system is understood to mean an electrical network which ensures that power is supplied to various appliances by means of a wire-borne AC voltage within a self-contained unit, for example within a house, a residence, a building, a vehicle, a railroad train, a ship, an aircraft, etc. Accordingly, an AC voltage source is understood to mean a generator, a transformer substation, a substation, an inverter in a photovoltaic installation, etc. In this case, the AC power supply can also be used just for the purposes of data transmission.

A transmitter is subsequently understood to mean an apparatus which transfers a signal to a transmission medium, in the present case a two-wire or three-wire line in an AC power supply system, so that said signal can be picked up by an appropriate receiver. Although the terms transmitter and receiver are always used in the present case, a transmitter may have not only its transmission functionality but also means, as a result of which the transmitter can also receive signals. Accordingly, the receiver may also be designed such that it sends signals and transfers them to the transmission medium. This functionality not only allows data transmission in one direction but allows bi-directional communication. In conventional building power supply systems, however, the present invention allows transmission and reception in one direction only. Particularly since the receiver essentially comprises a resistor, this resistor needs to be looped into the circuit, which is not possible at the load end. If the aim is to allow bi-directional communication, the present invention can be combined with another transmission/reception method.

At this juncture and subsequently, current FSK modulation is understood to mean signal modulation which is similar to the known frequency shift keying modulation (FSK modulation) but which modulates a current instead of a voltage. Furthermore, the frequency signal does not necessarily have a pure sine shape and is not modulated around the zero point. On the contrary, the signal approximates a $\sin^2$ shape or a Gaussian shape and therefore oscillates not around the zero point but rather around Vpp/2. Accordingly, a current FSK modulator is understood to mean an apparatus which modulates a signal using current FSK modulation. Furthermore, continuous phase FSK, as a variant of FSK, is also intended to be understood by the term FSK.

Subsequently, the term close is understood to mean that it is intended to be considered in relation to a length of the AC line for a load group. Such AC lines in a building installation may be up to approximately 100 m. In this context, the term close is intended to be understood to mean that it covers between a few cm and 50 cm.

In a method according to the invention for data transmission from a transmitter to a receiver in an AC power supply system, the transmitter uses a current source to supply the AC power supply system with a signal. In this case, the AC power supply system comprises a distributor and at least one load group with one or more loads. The fact that the signal is supplied by means of a current source and is therefore imposed on the AC power supply system as a current signal means that the signal can be detected very easily. Furthermore, this allows supply which is independent of the phase of the AC voltage, since no voltage values needs to be taken into account. Only at the zero crossing of the system voltage is transmission not possible, since there is no voltage available at this point. It has been found to be advantageous if the current pulses are synchronized to the zero crossing of the system voltage. It is therefore possible to dispense with complicated recognition of the start of a signal or of a bit without adversely affecting the interference immunity of the system. The receiver knows precisely when a signal is to be expected. In particular, a timer can be used to define particular transmission windows. The zero crossing of the system voltage thus provides a means which allows precise synchronization of transmitter and receiver.

In a 230V AC power supply system, the current source can deliver a current of 200 mA for example. It goes without saying that other current values can also be used. In this case, the transmission power is dependent on the limit values which a product class requires for the line-borne electromagnetic energies, on the maximum permissible power loss via the transmission transistor and on the duration of the communication. Similarly, use in the 115/120V AC power supply system is also possible.

The current source can simulate an additional load. An additional normal load likewise imposes an additional current signal on the AC power supply system. The network operator is therefore unable to distinguish whether the additional current signal stems from a transmitter which is used for data transmission or whether an additional normal load is involved. It is therefore necessary to comply with substantially fewer standards and regulations than if transmission signals were to be actively supplied in a similar manner to the PLC method.

In principle, this method can be used to transmit a signal from approximately 3 kHz to approximately 10 MHz. It goes without saying that this is dependent on the bandwidth of the components used, particularly transistors, and on the respective valid provisions which need to be taken into account, however. It is particularly feasible to use this method in the Cenelec "B" band, that is to say in a range of 85-120 kHz, because it can also coexist with other voltage-driven methods there and makes a good compromise in terms of line attenuation. With an optimum design of a series resonant circuit, the size and efficiency thereof are also at an optimum in the above frequency range. Applications in the 8-25 kHz range are also conceivable, however.

It has been found to be advantageous if the signal is subjected to current FSK modulation in the transmitter. It has been found that current FSK modulation involves a reduced probability of error. As already mentioned, the pulse shape of the current FSK modulation approximates a $sin^2$ shape or a Gaussian shape in the best possible way in this case. Therefore, the harmonic spectrum resulting from the current FSK modulation can be as close as possible to the theoretical minimum. This in turn has the advantage that the maximum transmission power in the receiver, which filters out the transmission frequencies as exactly as possible, is made available. Furthermore, the radiated RF power is therefore severely limited outside of the permitted frequency bands and can be kept within the legally prescribed limits more easily. It goes without saying that other types of modulation, for example a pulse position method, where a bit is signaled by a pulse group at a particular position in time, or a single pulse method or pulse length coding, where a pulse corresponds to a bit or a plurality of bits, can also be used.

A current profile with a modulated signal has specific superimposition of the general current profile within at least one time window. In this case, the time window is at a defined interval of time from the zero crossing of the AC voltage from an AC voltage source. The data signal is contained in the modulation of the specifically impressed current. In this case, the data signal may have been modulated in different ways, preferably by FSK. The edges of the modulation may correspond to a prescribed or prescribable pulse shape. It is therefore possible to achieve optimization of the data transmission in the AC power supply system in terms of EMC. It has been found to be advantageous if the edges of a $sin^2$ curve or a Gaussian curve are approximated. Other edge shapes are likewise conceivable.

The signal can be supplied close to or in the load. A supply arranged as close as possible to the load, particularly when the supply is integrated directly in the load, dispenses with connecting lines from the load to the transmitter. This is advantageous particularly when the transmitter needs to transmit a status report about the state of the load to the receiver. In particular, it is therefore possible to check directly whether the status of the load corresponds to a status which has been indicated to the load in advance in a particular command. Further information which can be communicated in this way is identification numbers or current/power consumption values, for example.

The transmitter and the receiver can be synchronized using the zero crossing of the AC voltage. Synchronization of both the transmitter and the receiver to the sine of the AC voltage makes recognizing the start of a bit and hence of a data message very simple. Timers can be used to determine defined transmission windows. Since the sine signal of the AC voltage provides a precise synchronization signal in the entire communication system, the transmitter and the receiver can always be synchronized to one another perfectly. The reception of the transmission bit is therefore simplified and the interference immunity of the system is simultaneously increased.

The signal can be supplied independently of a zero crossing of the AC voltage. Theoretically, transmission could be uninterrupted, i.e. over the entire phase of the AC voltage, which can result in a significantly higher data transmission rate in comparison with other methods which are able to send only at the zero crossing. However, it is naturally possible to stimulate current consumption only for as long as an appropriate voltage is also available. This means that an adequate current pulse cannot be generated very close to the zero crossing. By contrast, a voltage-driven PLC system can also draw power from a capacitor during the zero crossing in order to impress voltage pulses against the source impedance.

The fact that the signal is supplied using a current source and hence is imposed on the AC power supply system as a current signal means that the signal can be detected very easily. Such detection can be effected by a shunt, for example. Thus, such a shunt or resistor will have a voltage drop across it which is proportional to the current imposed by the current source in the AC power supply system. The receiver is therefore able to read the signal from the AC power supply system easily using a shunt. In order to allow evaluation of the data irrespective of the level of the current signal, the signal can be supplied to an automatic gain controller following reading by the shunt. Furthermore, it may be advantageous if blanking occurs in the receiver outside of a defined reception window so that the receiver is not dazzled or overdriven by interference propagating on the AC power supply system.

In this case, the signal can be read close to the distributor.

An arrangement according to the invention for data transmission for AC power supply systems comprises an AC power supply system having a distributor and at least one load group with one or more loads, at least one transmitter and a receiver. In this case, the transmitter is designed such that it comprises a current source for supplying a signal to the AC power supply system.

In this case, the transmitter may be integrated in the load or may be arranged close to the load.

As a result of a supply which is arranged as close as possible to the load, particularly when the supply is integrated directly in the load, it is possible to dispense with connecting lines from the load to the transmitter. Preferably, the transmitter is integrated directly in the load, for example at the system input thereof. This is advantageous particularly when the transmitter needs to transmit a status report about the state of the load and other information corresponding to the load to the receiver. In particular, it is therefore possible to check directly whether the status of the load corresponds to a status which has been indicated to the load in advance with a particular command.

The transmitter may comprise a current FSK modulator. Accordingly, the receiver naturally also needs to have a current FSK demodulator, so that trouble-free communication can be ensured. Current FSK modulation has been found to be advantageous because it allows a reduction in the probability of error in comparison with other types of modulation. As already mentioned in advance, other types of modulation are also possible, for example a pulse position method, or a single pulse method or pulse length coding.

The receiver may comprise a shunt for the purpose of reading the signal from the AC power supply system. This shunt carries Current-FSK-modulated current imposed on the AC power supply system by the transmitter and directly produces an appropriate voltage drop across the shunt. This voltage drop can easily be used and processed further.

The receiver may be arranged close to the distributor. An arrangement in which the receiver is close to the distributor and the transmitter is close to the load, wherein the transmitter and receiver are associated with the same load group, can be used to construct a simple star-shaped communication network structure, particularly for the return channel, for example. Such a star-shaped communication network structure has the advantage that each load group or each circuit has a separate communication channel which is separate from the communication channel of a further load group. It is therefore possible to multiply the bandwidth of the data transmission in the system as a whole.

So as optionally to reject any crosstalk by a signal from the transmitter in a first load group to the receiver in a second load group, which is possible particularly when there is a high source impedance at the supplier end, the distributor may have a series resonant circuit, particularly a first and a second series resonant circuit. In this case, the first series resonant circuit preferably has a resonant frequency which corresponds to the first current FSK frequency. A second series resonant circuit then has a resonant frequency which corresponds to the second current FSK frequency. Such a series resonant circuit is arranged at the supplier end upstream of the shunt and therefore ensures a significantly lower source impedance for the relevant FSK frequencies. Therefore, both current FSK frequencies can be actively shorted at the supply end, and crosstalk in a further communication channel or in another load group is prevented. Furthermore, this increases the sensitively of the current measurement for the current FSK signal, because this significantly reduces the source of impedance in the frequency range of the transmitter and there is therefore more of the voltage drop across the shunt. Experiments have shown that a simple high-voltage resistant capacitor also works well at this location. However, this produces an increased reactive power in the system, since the capacitor is active over the entire lower frequency range. The use of relatively narrowband series resonant circuits reduces the reactive power to a negligible value.

A transmitter according to the invention for data transmission for AC power supply systems comprises a current source, particularly in the form of a MOSFET, for imposing a load current on an AC power supply system, and a pulse generator, for generating a signal having a predetermined or predeterminable pulse shape. Preferably, the pulse shape in this case corresponds to an approximated $sin^2$-shaped or Gaussian curve. In an alternative circuit, the transmitter may additionally have a current mirror, for actuating the current source with a modulated current signal. In both cases, the transmitter can be connected directly to an AC power supply system in parallel with a load and, in particular, has no coupling transformer. The fact that it is possible to dispense with any coupling transformers means that the transmitter can be designed very compactly. Furthermore, these circuits allow the transmission pulses to be generated using a single very small transistor. The transmitter can therefore very easily be integrated on one silicon chip or can be combined inexpensively and compactly in an electronic assembly with one chip.

A building power supply system according to the invention comprising one or more of the aforementioned arrangements can, as already described in advance, be used to construct a simple star-shaped communication network structure.

If the aforementioned arrangements are extended for bi-directional communication and the arrangements are connected, for example via a databus, to one another and/or to an optional central computation unit in the distributor, for example, then it is possible to construct a complete star-shaped communication network structure.

A method for data transmission between an electrical appliance, which is suitable for being connected by means of a connecting line to an AC power supply system in accordance with its operating voltage, and a receiver, wherein the appliance has a transmitter with a current source, comprises the following steps:

the appliance is connected to the receiver by means of the connecting line, an AC voltage is generated on the connecting line between the appliance and the receiver by the receiver, wherein the AC voltage corresponds to the operating voltage of the appliance, a signal is supplied to the connecting line by means of the current source.

By way of example, such an apparatus allows operating data from an appliance to be read without needing to connect the appliance to an AC power supply system. In this case, the receiver may be designed to be independent of the AC power supply system, e.g. to be battery operated.

The invention is explained in more detail below with reference to figures, which merely show exemplary embodiments and in which.

Figure 1:
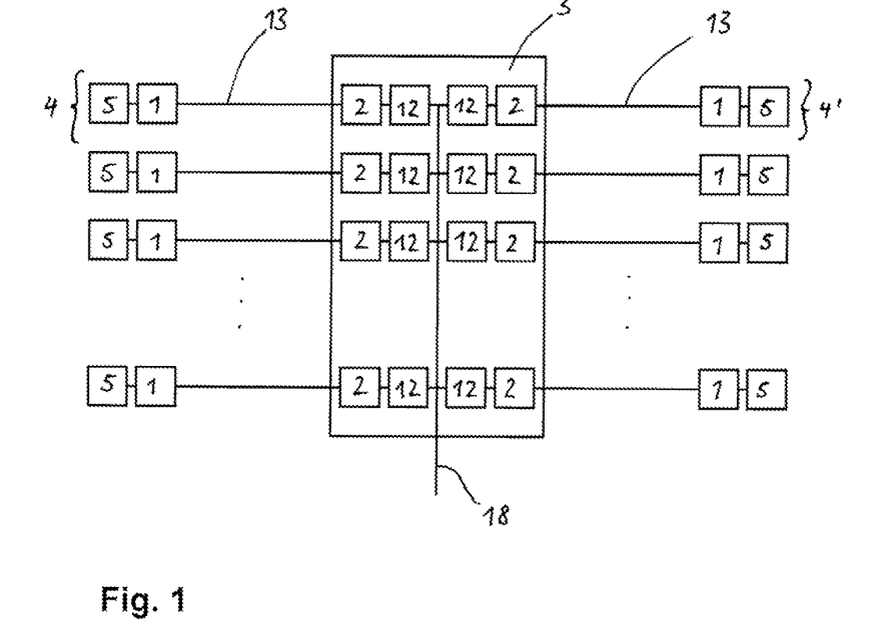
FIG. 1 shows a schematic illustration of an arrangement according to the invention in a building power supply system.

FIG. 1 shows a schematic illustration of an arrangement according to the invention in a building power supply system. In this case, a system access 18 has a distributor 3 connected to it which performs the distribution of the alternating current over the individual load groups 4, 4' in the building. Each load group 4, 4' has a fuse 12 which isolates the load group from the system in the event of a fault. Arranged directly adjacent to the fuse 12 in each load group 4, 4' is a receiver 2, before the system voltage is delivered to the load 5 via a lines 13. Arranged directly upstream of the load 5 is a transmitter 1 which can impress a current signal on the AC power supply system. If a plurality of loads 5 are connected in the same load group 4, 4', each load may have a dedicated transmitter.

Figure 2:
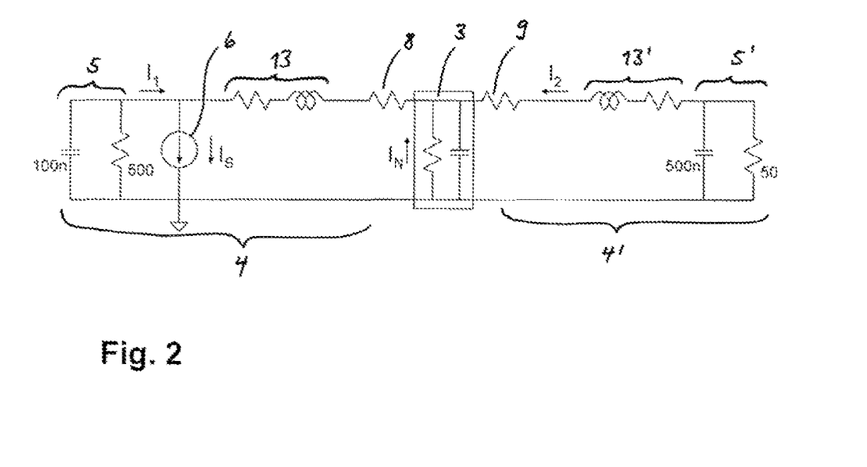
FIG. 2 shows a simplified equivalent circuit diagram of an arrangement according to the invention with two load groups.

FIG. 2 shows a simplified equivalent circuit diagram of an arrangement according to the invention with two load groups 4, 4' and a distributor 3. The fuses 12 (see FIG. 1) are not shown in this case. In accordance with the requirements for power distribution, the system impedance which can be measured at the distributor 3 is represented by a small resistor. On account of the inevitable line inductances, FIG. 2 additionally shows a coil in series with this resistor, which results in a significantly higher source impedance for the system in the region of the current FSK transmission frequencies.

In this case, the load 5 in the load group 4 is simulated by a resistance of 500 Ω and a capacitance of 100 nF, for example. Such a load model corresponds approximately to a light bulb and an appliance with a radio interference suppression capacitor. The load 5' in the adjacent load group 4' is modeled with 50 Ω and 500 nF, for example. This corresponds to the entirely realistic case of a plurality of light bulbs switched on and a plurality of appliances with radio interference suppression capacitors.

The supply lines from the distributor 3 to the load 5, 5' is represented by the equivalent circuit diagram of a line 13, 13'. For a 20 m line, this corresponds approximately to a resistance of 0.7 Ω and an inductance of 8 µH. Next to the distributor 3 in each load group, a shunt 8, 9 is shown which represents the receiver. Such a shunt 8, 9 has a resistance value of 0.1Ω, for example. For the purpose of supplying a signal, the load 5 has a current source 6 which delivers a transmission current $I_S$ with a peak value of approximately 200 mA. This current source 6 is part of the transmitter, which impresses a current-FSK-modulated current signal onto the line 13. This current signal is then detected via the shunt 8 of the receiver and is converted into an appropriate voltage.

FIG. 2 also shows the split of the transmission current $I_S$. Inevitably, a portion $I_1$ which does not flow via the shunt 8 of the receiver is already picked up by the individual load. The current $I_N$ flowing via the system passes through the individual shunt 8. Although the current $I_2$ flowing into the adjacent load group 4' also passes through the individual shunt 8, it also passes through the shunt 9 of the adjacent load group 4'. Since this load group has been shown to be heavily loaded and has a plurality of lights and a plurality of radio interference suppression capacitors, for example, the current $I_2$ is not negligible and results in undesirable crosstalk. The following then applies:

$$I_S = I_1 + I_N + I_2$$

Figure 3:
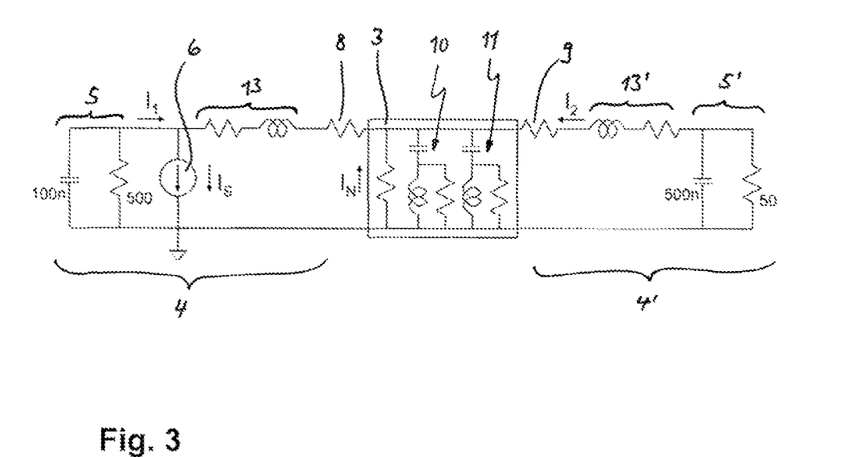
FIG. 3 shows the equivalent circuit diagram from FIG. 2, but with a modified distributor and a capacitive load.

In FIG. 3, two series resonant circuits 10 and 11 are disposed at the location of the distributor. These resonant circuits are attuned to the two current FSK frequencies. With careful component selection to attain a high level of quality, the series resonant circuits behave almost like short circuits at the transmission frequencies. As a result, the impedances of the system and the load groups are almost negligible. In the case of the usually low line impedances 13 and 13', the following then applies approximately for the current split:
$I_N \approx I_S$ The current flowing via the system and the shunt 8 is almost as large as the transmission current.
$I_1 \approx 0$ The current absorbed by the load 5 itself is negligible.
$I_2 \approx 0$ The current penetrating the adjacent circuit 4' is negligible. This prevents crosstalk.

At current FSK frequencies of 100 kHz and 110 kHz, it is possible for the series resonant circuits to be formed by a capacitance of 470 nF and an inductance of 4.45 µH or 5.4 µH, respectively.

Figure 4:
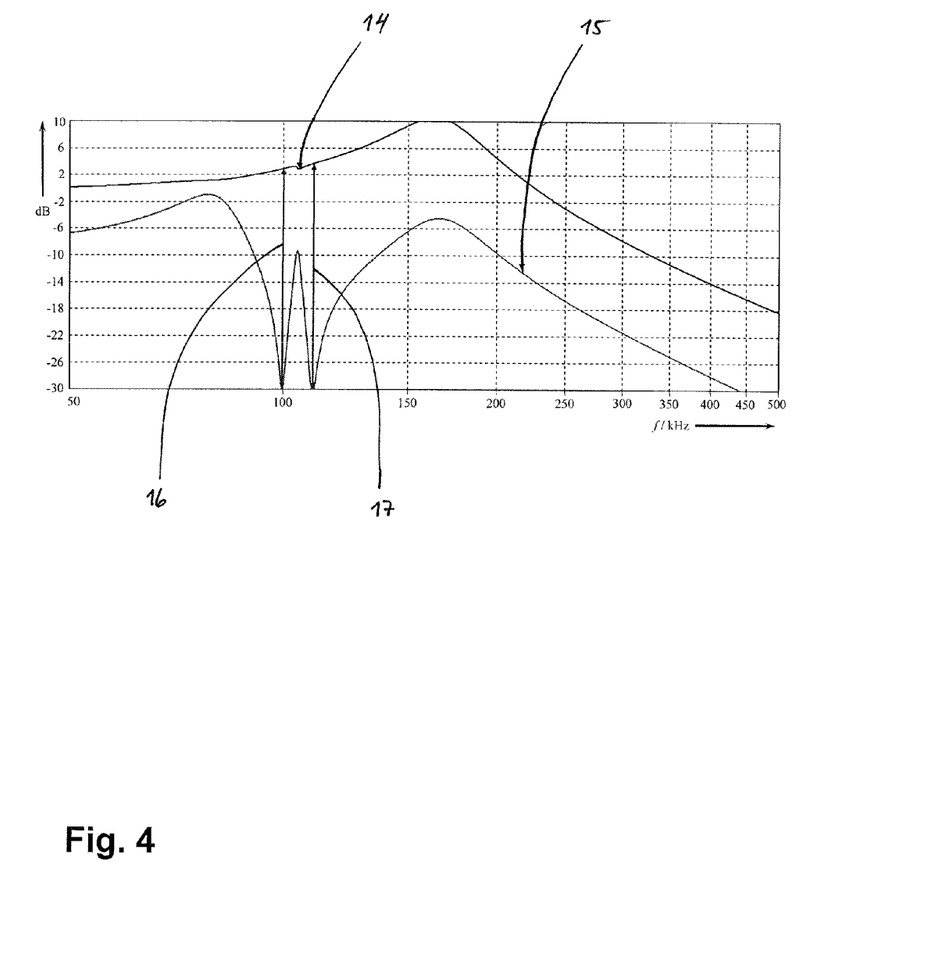
FIG. 4 shows a frequency response for the currents on both shunts in the Cenelec "B" band from FIG. 3.

FIG. 4 shows a frequency response for the currents on both shunts 8, 9. In this case, the frequency response 14 shows the current in the shunt 8 (see FIG. 3) and the frequency response 15 shows the current in the shunt 9 (see FIG. 3). The figure likewise shows the two current FSK frequencies 16 and 17, which are at 100 kHz and 110 kHz, respectively. The short-circuit-like response of the series resonant circuits at the transmission frequencies is clearly evident here from the values with acutely to severely negative profiles.

Figure 5:
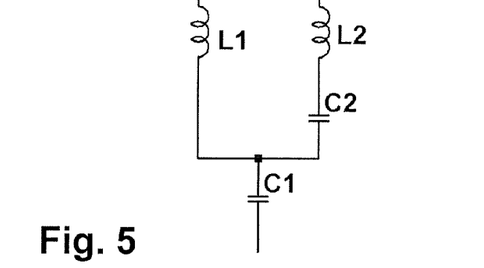
FIG. 5 shows a variant of a double series resonant circuit.

FIG. 5 shows a variant of a double series resonant circuit in which only a large high-voltage capacitor C1 is required in order to achieve small component dimensions. This means that there is also a fall in the reactive current produced at the system frequency. The frequency response of this circuit corresponds to FIG. 4 in qualitative terms, and likewise has two sharp minima at the transmission frequencies. The capacitor C2 can be designed for far lower peak voltages and retains a small size. This circuit variant is suitable for low transmission frequencies at which the current FSK frequencies are relatively far apart. Otherwise, unfeasible values of C2 and L2 are obtained during the design calculation.

Figure 6:
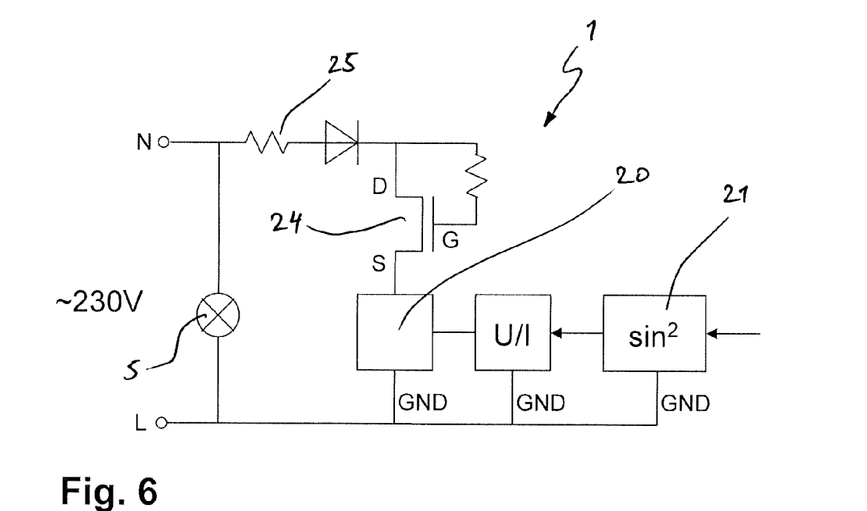
FIG. 6 shows an equivalent circuit diagram of a current FSK transmitter according to the invention with a current mirror.

FIG. 6 schematically shows an equivalent circuit diagram of a current FSK transmitter 1 according to the invention with a current mirror 20. In this case, the transmitter 1 is connected to the AC power supply system, represented by the two ~230V connections, in parallel with a load 5, represented by a light bulb. On the basis of a signal from a data communication output, a pulse generator 21 generates a $sin^2$ signal which is then forwarded to the current mirror 20. This current mirror 20 now impresses a current signal, modulated by a current FSK modulator (not shown) as appropriate, on the AC power supply system via the MOS-FET 24. An optional resistor 25 is used for current limiting.

Figure 7:
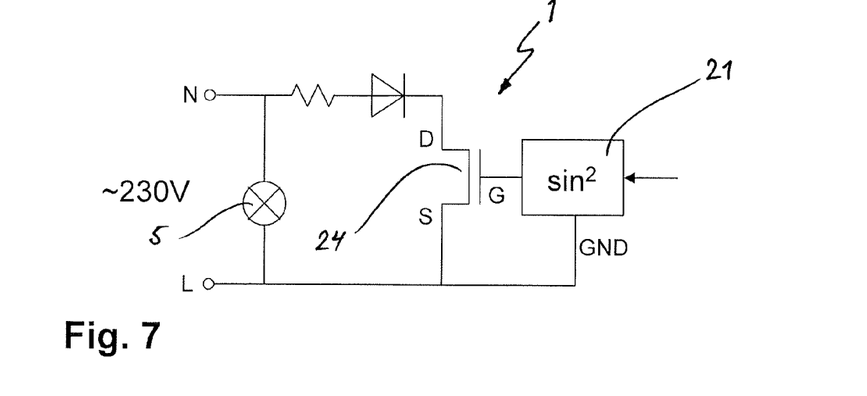
FIG. 7 shows an equivalent circuit diagram of an alternative circuit for a current FSK transmitter without a current mirror.

FIG. 7 schematically shows an equivalent circuit diagram of an alternative circuit for a current FSK transmitter 1 according to the invention without a current mirror. In this case too, the transmitter 1 is connected to the AC power supply system, represented by the two ~230V connections, in parallel with a load 5, represented by a light bulb. On the basis of the FSK signal from a data communication output, a pulse generator 21 generates a $\sin^2$ signal which is then forwarded to the power transistor 24.

It goes without saying that instead of the current FSK modulator it is also possible to use a modulator for other modulation methods, for example for a pulse position method or a single pulse method or pulse encoding, both in the circuit shown in FIG. 6 and in the circuit shown in FIG. 7.

The invention claimed is:

1. A method for transmitting a data signal in a return channel from a transmitter arranged at a load in the direction of an AC voltage source to a receiver in an AC power supply system having a distributor and at least one load group with one or more loads,
   the transmitter comprises a current source and a pulse generator, and the current source is connected in parallel to the load, the method comprising:
   generating via the pulse generator and the current source a current signal, with a predetermined or predeterminable pulse shape on a basis of the data signal, wherein the data signal comprises information about the status of the load,
   connecting the transmitter, via the AC power supply system, to the receiver so that the current source of the transmitter can transmit the current signal, along the AC power supply system to the receiver,
   supplying the current signal directly from the current source of the transmitter to the AC power supply system;
   receiving the current signal, which is transmitted along the AC power supply system, by the receiver; and
   rejecting crosstalk by the signal from the transmitter in a first load group to the receiver in a second load group via a series resonant circuit arranged in the distributor.

2. The method as claimed in claim 1, wherein the current source simulates an additional load.

3. The method as claimed in claim 1, wherein the signal is subjected to current FSK modulation.

4. The method as claimed in claim 1, wherein the signal is supplied close to or in the load.

5. The method as claimed in claim 1, wherein the transmitter and the receiver are synchronized using the zero crossing of the AC voltage.

6. The method as claimed in claim 1, wherein the signal is supplied independently of a zero crossing of the AC voltage.

7. The method as claimed in claim 1, wherein the receiver reads the signal from the AC power supply system using a shunt resistor.

8. The method as claimed in claim 1, wherein the signal is read close to the distributor.

9. An arrangement for transmitting a data signal in a return channel from at least one transmitter arranged at a load in the direction of an AC voltage source to a receiver in AC power supply systems, comprising
   an AC power supply system having a distributor and at least one load group with one or more loads,
   the transmitter,
   the receiver,
   wherein the transmitter comprises a current source and a pulse generator, and the current source is connected in parallel to the load, the pulse generator and the current source generate a current signal with a predetermined or predeterminable pulse shape on a basis of the data signal, wherein the data signal comprises information about the status of the load,
   the transmitter is connected to the receiver via the AC power supply system so that the current source of the transmitter can transmit the current signal, along the AC power supply system to the receiver,
   the current source of the transmitter is connected directly to the AC power supply system for supplying the current signal directly from the current source to the AC power supply system to be transmitted along the AC power supply system and to be received by the receiver,
   wherein the distributor has a series resonant circuit for rejecting crosstalk by the signal from the transmitter in a first load group to the receiver in a second load group.

10. The arrangement as claimed in claim 9, wherein the transmitter is integrated in the load or is arranged close to the load.

11. The arrangement as claimed in claim 9, wherein the transmitter comprises a current FSK modulator.

12. The arrangement as claimed in claim 9, wherein the receiver comprises a shunt resistor for reading the signal from the AC power supply system.

13. The arrangement as claimed in claim 9, wherein the receiver is arranged close to the distributor.

14. The arrangement as claimed in claim 9, wherein the series resonant circuit comprises a first and a second series resonant circuit.

15. The arrangement as claimed in claim 14, wherein said first series resonant circuit has a resonant frequency which corresponds to the first current FSK frequency.

16. The arrangement as claimed in claim 14, wherein said second series resonant circuit has a resonant frequency which corresponds to the second current FSK frequency.

* * * * *